(12) United States Patent
Richardson et al.

(10) Patent No.: US 7,986,648 B2
(45) Date of Patent: *Jul. 26, 2011

(54) METHODS AND APPARATUS FOR COMMUNICATING INFORMATION USING DIFFERENT TYPES OF SYMBOLS

(75) Inventors: Thomas Richardson, South Orange, NJ (US); Junyi Li, Bedminster, NJ (US); Rajiv Laroia, Far Hills, NJ (US); Xinzhou Wu, Monmouth Junction, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 926 days.

This patent is subject to a terminal disclaimer.

(21) Appl. No.: 11/933,403

(22) Filed: Oct. 31, 2007

(65) Prior Publication Data
US 2009/0109950 A1 Apr. 30, 2009

(51) Int. Cl.
*H04B 7/00* (2006.01)
(52) U.S. Cl. ....................................... 370/310
(58) Field of Classification Search ............. 370/310, 370/342, 345–349, 464; 709/227–230, 246
See application file for complete search history.

(56) References Cited

U.S. PATENT DOCUMENTS

| 5,818,813 | A  | * | 10/1998 | Saito et al. | 370/208 |
| 7,567,502 | B2 | * | 7/2009  | Laroia et al. | 370/208 |
| 2004/0081131 | A1 | * | 4/2004 | Walton et al. | 370/344 |
| 2005/0048979 | A1 | * | 3/2005 | Chun et al. | 455/443 |

FOREIGN PATENT DOCUMENTS

| WO | 2004040803 | 5/2004 |
| WO | 2006043242 | 4/2006 |

OTHER PUBLICATIONS

International Search Report—PCT/US07/083389, International Search Authority—European Patent Office, Sep. 1, 2008.
Written Opinion—PCT/US07/083389, International Search Authority—European Patent Office, Sep. 1, 2008.

* cited by examiner

*Primary Examiner* — Dmitry H Levitan
(74) *Attorney, Agent, or Firm* — James K. O'Hare (57) ABSTRACT

Methods and apparatus implementing communications using different types of symbols, e.g. different characteristic OFDM symbols, at different times for different purposes are described. A first type of symbol is used for control signaling including conveying transmission request signals and/or transmission request response signals. A second type of symbol is used for conveying user data, e.g., traffic signals. The symbol period for a first type symbol is larger than the symbol period for a second type symbol. The tone spacing for a first type symbol is larger than the tone spacing for a second type symbol. The methods and apparatus are well suited for peer to peer communications systems in which a peer to peer communications device operates in a half-duplex mode of operation.

46 Claims, 8 Drawing Sheets

METHODS AND APPARATUS FOR COMMUNICATING INFORMATION USING DIFFERENT TYPES OF SYMBOLS

FIELD

Various embodiments are directed to wireless communications systems and more particularly, to peer to peer communications systems utilizing OFDM symbols.

BACKGROUND

Various wireless communications systems use OFDM symbols to communicate information. It is convenient to construct and operate such a system utilizing a uniform OFDM symbol structure, e.g., same tone spacing, the same set of contiguous tones, and same symbol duration, irrespective of the type of information being communicated. However, a one size OFDM symbol implementation is not necessarily the best approach from an efficiency standpoint. Different types of information and/or different situations can be better suited to be communicated using different types of characteristic OFDM symbols. It would be advantageous if methods and apparatus were developed which utilized different types of characteristic OFDM symbols at different times to better suit the type of information being communicated and/or situational needs. Methods and apparatus that allowed a wireless communications device to limit transmission time and/or be more informed of interference would also be beneficial.

SUMMARY

Methods and apparatus implementing communications using different types of symbols, e.g. different characteristic OFDM symbols, at different times for different purposes are described. A first type of symbol is used for control signaling including conveying transmission request signals and/or transmission request response signals. A second type of symbol is used for conveying user data, e.g., traffic signals. The symbol period for a first type symbol is larger than the symbol period for a second type symbol. The tone spacing for a first type symbol is larger than the tone spacing for a second type symbol. The described methods and apparatus are well suited for peer to peer communications systems in which a peer to peer communications device operates in a half-duplex mode of operation and makes decisions as to whether or not to utilize a shared traffic air link resource. Various embodiments facilitate the collection and estimation of interference information by a peer to peer wireless communications device.

An exemplary method of operating a first communications device to communicate with a second communications device, in accordance with various embodiments, comprises: transmitting a first control signal to the second communications device on a first symbol having a first symbol period; and transmitting user data to the second communications device on a second symbol having a second symbol period, the first and second symbol periods being different. An exemplary communications device, in accordance with various embodiments, comprises: a first type symbol generation module for generating symbols of a first type used to communicate control information, symbols of said first type having a first symbol period; a second type symbol generation module for generating symbols of a second type, symbols of a second type having a second symbol period, said first and second symbol periods being different; and a wireless transmitter for transmitting symbols of the first type communicating control information and symbols of the second type communicating user data.

An exemplary method of operating a second communications device to communicate with a first communications device, in accordance with various embodiments, comprises: receiving a control signal from the first communications device on a first symbol having a first symbol period; and receiving user data from the first communications device on a second symbol having a second symbol period, the first and second symbol periods being different. A second communications device for communicating with a first communications device, in various embodiments, comprises: a receiver for receiving control signals and user data signals; a first type symbol recovery module for recovering first type symbols used to communicate control information, the first type symbols having a first symbol period; and a second type symbol recovery module for recovering second type symbols used to communicate user data, said second type symbols having a second symbol period, the first and second symbol periods being different.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
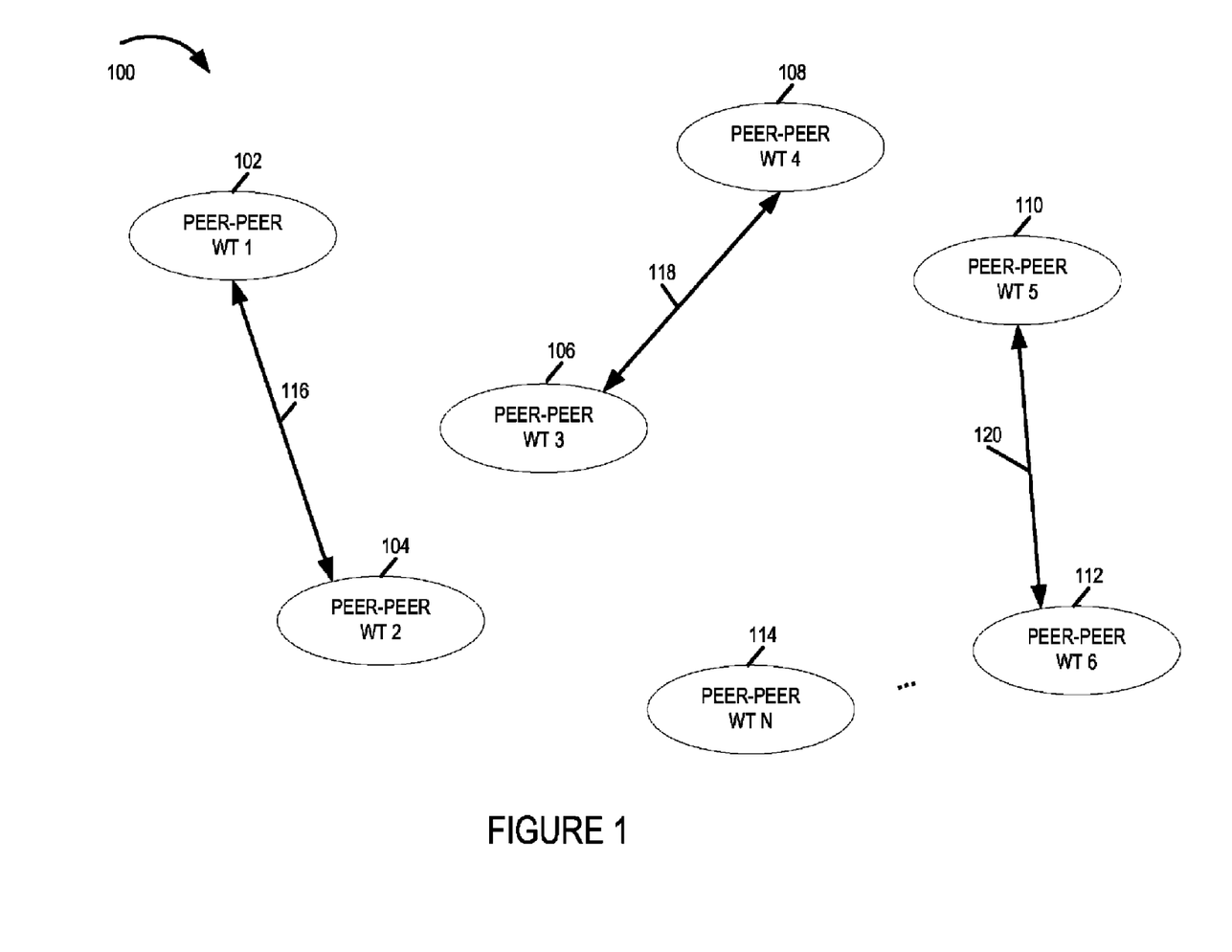
FIG. 1 is a drawing of an exemplary peer to peer wireless communications system in accordance with various embodiments.

FIG. 1 is a drawing of an exemplary peer to peer wireless communications system 100 in accordance with various embodiments. Exemplary wireless communications system 100 includes a plurality of wireless terminals, e.g., mobile nodes, supporting peer to peer communications (peer to peer wireless terminal 1 102, peer to peer wireless terminal 2 104, peer to peer wireless terminal 3 106, peer to peer wireless terminal 4 108, peer to peer wireless terminal 5 110, peer to peer wireless terminal 6 112, . . . , peer to peer wireless terminal N 114). In this example, at the time represented by FIG. 1, peer to peer wireless terminal 1 102 has an active connection with peer to peer wireless terminal 2 104 as indicated by arrow 116; peer to peer wireless terminal 3 106 has an active connection with peer to peer wireless terminal 4 108 as indicated by arrow 118; and peer to peer wireless terminal 5 110 has an active connection with peer to peer wireless terminal 6 112 as indicated by arrow 120.

In accordance with a feature of various embodiments, a decision whether or not to transmit on a peer to peer air link traffic resource, e.g., a peer to peer traffic segment, is performed in a distributed manner with both the transmission node and receiving node having an input into the decision process. In various embodiments, interference considerations regarding other peer to peer communications devices which may desire to transmit on the same peer to peer air link traffic resource are considered in making a transmission decision. In some such embodiments, monitored peer to peer signals from peer to peer devices with which a peer to peer device does not have an active connection are used in the transmission decision process.

In some embodiments, following a transmission request to transmit traffic signals, both the intended receiving device and the intended transmission device have an opportunity to yield to other peer to peer devices and refrain from allowing the requested peer to peer traffic signaling to proceed.

In some embodiments, following the transmission device's decision to transmit traffic and prior to transmission of said traffic, the transmission device transmits a peer to peer pilot signal. In some such embodiments, the peer to peer pilot signal is utilized by the receiving device to determine information, which is to be used to determine a data rate for the traffic data. In some embodiments, the air link resource conveying the traffic signals also conveys data rate information of the traffic.

In accordance with a feature of various embodiments, different types of symbols, e.g., different types of OFDM symbols, are used at different times, e.g., in accordance with a recurring peer to peer timing and frequency structure. For example, a first type of OFDM symbol is used for at least some control signals and a second type of OFDM symbol is used for user data signals, e.g., peer to peer traffic signals. In some such embodiments, the first type of symbol has a larger tone spacing than the second type of symbol, and the first type of symbol has a shorter symbol period than a second type of symbol.

Figure 2:
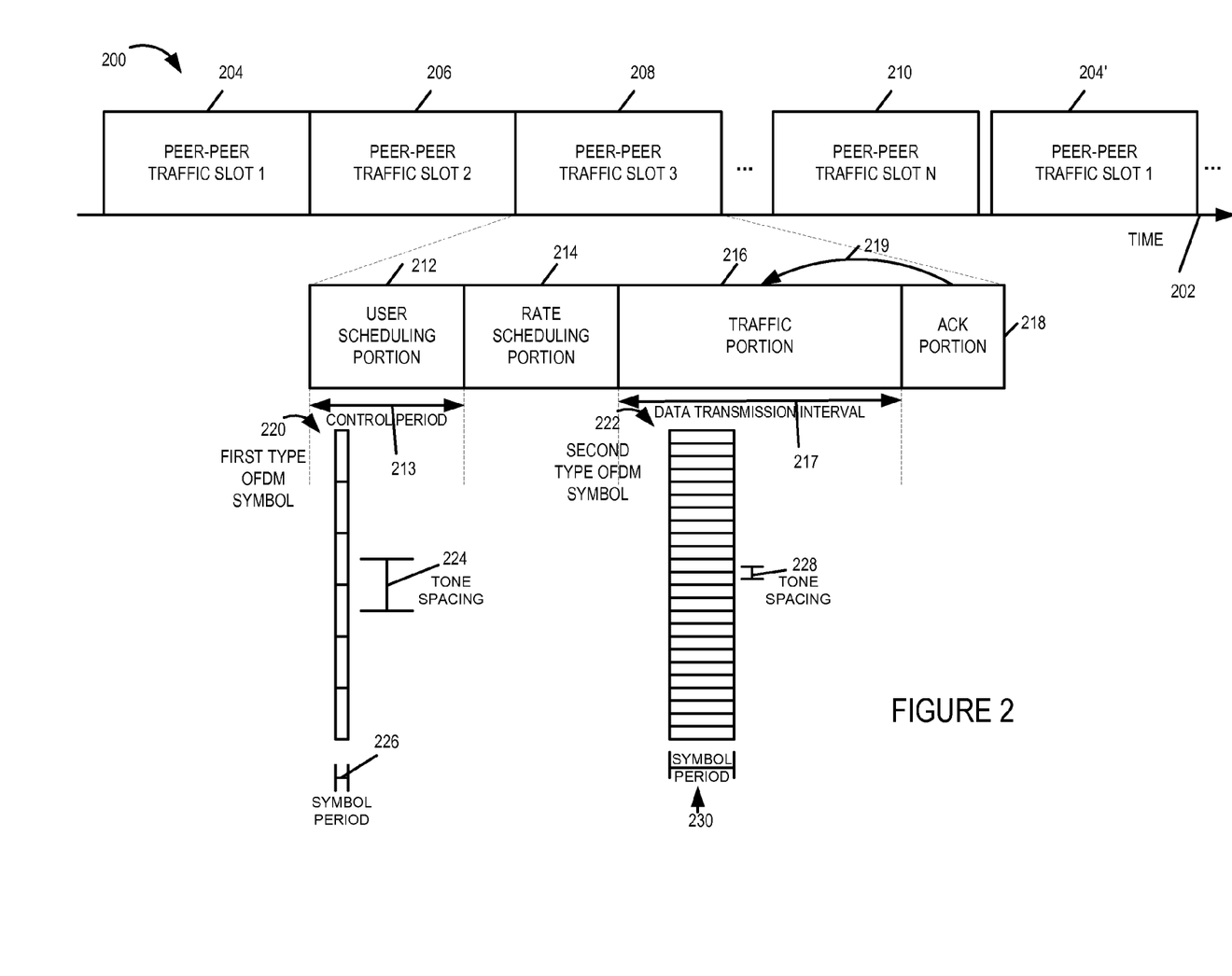
FIG. 2 is a drawing of exemplary peer to peer traffic slots in accordance with various embodiments.

FIG. 2 is a drawing 200 of exemplary peer to peer traffic slots in accordance with various embodiments. Drawing 200 illustrates an exemplary sequence of peer to peer traffic slots (peer to peer traffic slot 1 204, peer to peer traffic slot 2 206, peer to peer traffic slot 3 208, . . . , peer to peer traffic slot N 210) along time axis 202. In this exemplary embodiment, the sequence repeats as part of a recurring timing structure as indicated by peer to peer traffic slot 1 204' following peer to peer traffic slot N 210.

The exemplary drawing 200 is, e.g., a logical representation. In some embodiments, logical structure communications resources are mapped to physical air link resources. For example, peer-to-peer traffic slot 208 is shown to include user scheduling portion 212, rate scheduling portion 214, traffic portion 216, and acknowledgment portion 218, and those portions are adjacent to each other. The physical air link resources associated with those portions may have time gaps between them, e.g., to allow processing time. In some embodiments, tone hopping is implemented as part of the mapping.

Each exemplary peer to peer traffic slot, in some embodiments, includes a user scheduling portion, a rate scheduling portion, a traffic portion and an acknowledgement portion. In one exemplary embodiment, an exemplary peer to peer traffic slot, e.g., peer to peer traffic slot 3 208 includes user scheduling portion 212, rate scheduling portion 214, traffic portion 216 and acknowledgement portion 218. Acknowledgement portion 218 corresponds to traffic portion 216 as indicated by arrow 219. The user scheduling portion 212 occurs during a control period 213, while the traffic portion 216 occurs during a data transmission interval 217.

The user scheduling portion 212 includes at least some symbols designated for conveying traffic transmission request signals, e.g., a TX request signal, and at least some symbols designated for conveying traffic transmission request response signals, e.g., an RX echo signal.

Drawing 200 also illustrates characteristics of an exemplary first type of OFDM symbol 220 which occurs during the user scheduling portion 212 and an exemplary second type of OFDM symbol 222 which occurs during the traffic portion 216. Exemplary first type of OFDM symbol 220 has a first tone spacing 224 and a first symbol period 226. Exemplary second type of OFDM symbol 222 has a second tone spacing 228 and a second symbol period 230. In various embodiments, the first tone spacing is larger than the second tone spacing, e.g., by at least a factor of 4. In various embodiments, the second symbol period duration is longer than the first symbol period duration, e.g., by a factor of 5. Although two exemplary OFDM symbols are shown, it is to be understood that in control period 213 there are a plurality of first type OFDM symbols and in data transmission interval 217 there are a plurality of second type OFDM symbols.

In some embodiments, symbol period 226, which corresponds to a symbol period used for a symbol conveying a transmission request or a transmission request response is much larger than the symbol period 230 used for a symbol conveying user traffic signals. In one exemplary embodiment first type OFDM symbol 220 includes a cyclic prefix portion of 6.5 micro-sec and an FFT portion of 6.5 micro-seconds, while second type OFDM symbol 222 includes a cyclic prefix portion of 6.5 micro-seconds and a FFT portion which is greater than 100 micro-seconds. In some embodiments, a first type OFDM symbol 220 includes 32 tones while a second type OFDM symbol includes 128 tones or 512 tones.

In various embodiments, the control period 213 is much less than the data transmission interval 217. In various embodiments, the transmission request interval of the control period 213 is much less than the traffic interval 217, e.g., the traffic interval is at least 10 times longer than the transmission request interval of the control period 213.

Figure 3:
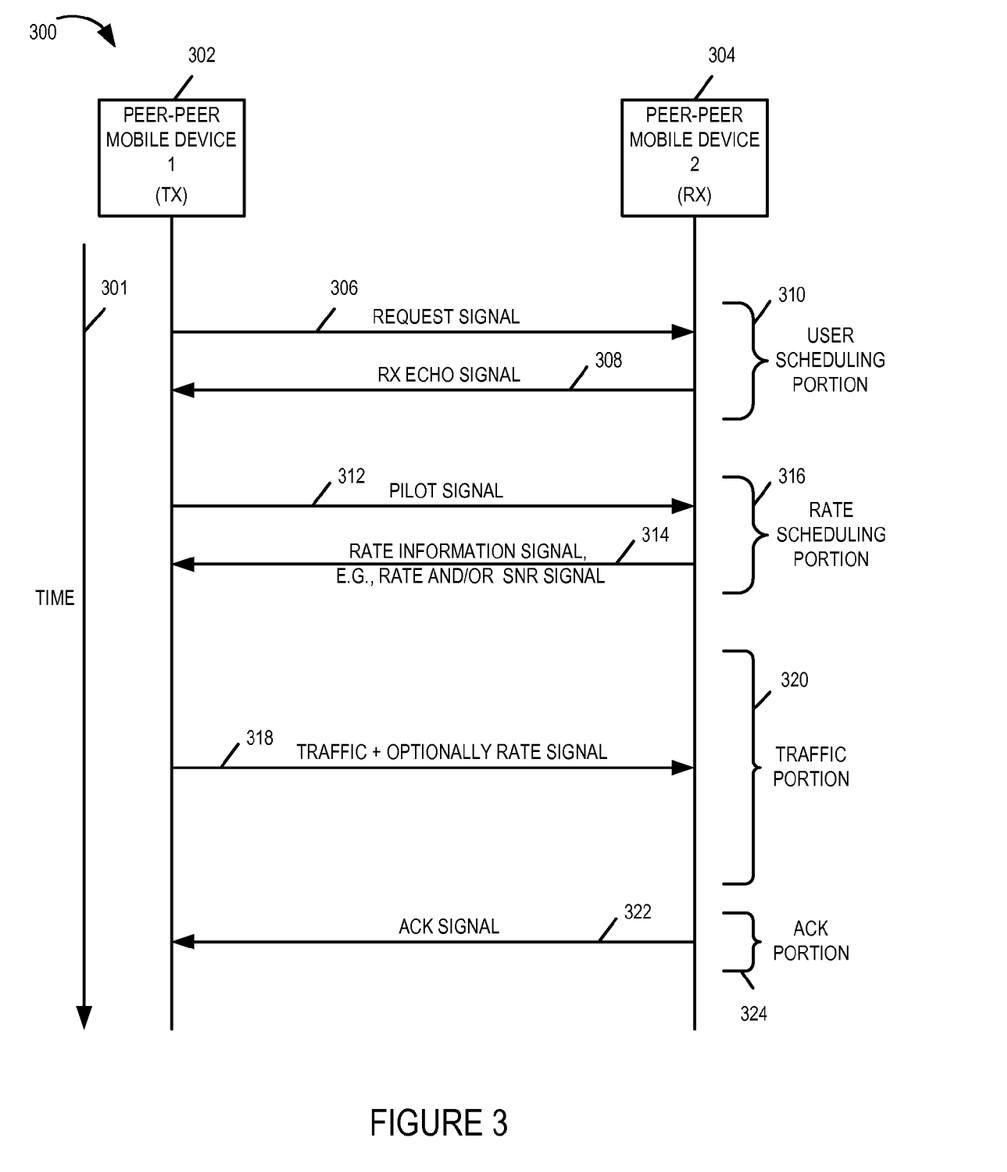
FIG. 3 is a drawing illustrating peer to peer mobile communications devices and exemplary signaling exchanged between the devices to support peer to peer traffic in accordance with various embodiments, e.g., under the situation where the first device wants to send traffic in the slot and the second device does not or under the situation where both devices may desire to transmit traffic but the first device has priority.

FIG. 3 is a drawing 300 illustrating peer to peer mobile communications devices (302, 304) and exemplary signaling exchanged between the devices (302, 304) to support peer to peer traffic in accordance with various embodiments, e.g., under the situation where the first device wants to send traffic in the slot and the second device does not or under the situation where both devices may desire to transmit traffic but the first device has priority. The communications devices (302, 304) may be any of the peer to peer wireless terminals of FIG. 1. In this example, peer to peer mobile device 1 302 desires to transmit traffic signals to peer to peer mobile device 2 304.

Line 301 indicates time; and there is a user scheduling portion 310, followed by a rate scheduling portion 316, followed by a traffic portion 320, followed by an acknowledgment portion 324.

During the user scheduling portion 310, peer to peer mobile device 1 302 generates and transmits request signal 306. Peer to peer mobile device 2 304, the intended recipient of request signal 306 receives request signal 306, processes the signal, considers the request, and sends an RX echo signal 308, if it approves of the request. If it does not approve the request, the peer to peer mobile device 2 304 does not send a response.

During rate scheduling portion 316, the peer to peer mobile communications device 1 302 sends pilot signal 312. Peer to peer mobile device 2 304 receives the pilot signal 312, measures the received signal strength, and generates a rate information signal 314. The rate information signal 314 communicates, e.g., a rate, an SNR value, an interference value, and/or an SIR value, so that peer to peer mobile device 1 302 can determine a maximum allowable data rate to be used during subsequent traffic portion 320. Peer to per mobile device 2 304 transmits the generated rate information signal 314 to peer to peer mobile device 1 302.

Peer to peer mobile device 1 302 receives the rate information signal 314 and determines a maximum allowed transmission rate to be used for traffic portion 320. Peer to peer mobile device 1 302 determines an actual data rate to use as a function of the determined maximum allowed transmission rate, wherein the actual data rate is less than or equal to the maximum allowed transmission rate. In various embodiments, the peer to peer mobile device 1 302 also considers (i) the amount of traffic data waiting to be communicated and/or (ii) its power status, e.g., remaining battery power and/or mode of operation, in determining the actual transmission data rate to use for the traffic.

Peer to peer mobile device 1 302 generates and transmits traffic signals 318 during traffic portion 320. The traffic signals communicate data at the determined actual data rate. In some embodiments, the traffic signals also carry an indication of the actual data rate. In one such embodiment, the rate information is communicated using a subset of the resources allocated for the traffic, e.g., the traffic resource includes a first portion, e.g., a first set of OFDM tone symbols, allocated to carry rate information, and a second portion, e.g., a second set of OFDM tone symbols, allocated to carry the traffic, e.g., user data, wherein the first and second sets are non-overlapping. In another such embodiment, the rate information is communicated using the same resources carrying traffic, e.g., the rate information is communicated via varying the transmit power of modulation symbols carrying traffic signals, e.g., some OFDM tone-symbols carrying the traffic are scaled at a first power level and others are scaled at a second power level, and the rate information is communicated by which positions are scaled at which levels.

Peer to peer mobile device 2 304 receives traffic signals 318 during traffic portion 320 and recovers the data being communicated. In some embodiments, rate information is also communicated with the traffic data. In some such embodiments, peer to peer mobile device 2 304 recovers the communicated rate information being communicated, and then decodes the traffic data signals. The peer to peer mobile device 2 304 determines whether or not the communicated data of the traffic signals 318 has been successfully recovered and generates a positive or negative acknowledgement signal.

During acknowledgment portion 324, the peer to peer mobile device 2 304 transmits the generated ACK signal 322 to mobile peer to peer to peer device 1 302. Peer to peer mobile device 1 302 receives the ACK signal 322, and updates transmission queue information based on the information conveyed by ACK signal 322.

Note that if peer to peer mobile device 1 302 does not receive an RX echo signal or subsequently decides not to proceed with transmission, the device 302 does not transmit pilot signal 312 and can terminate operation with regard to this traffic slot. Similarly, if peer to peer mobile device 304 decides not to proceed with transmission after it receives the request signal 306, the mobile device 304 does not transmit an RX echo signal and can terminate operation with regard to this traffic slot.

The process is repeated for additional traffic slots, e.g., as a function of traffic transmission needs of peer to per mobile device 1 302.

Note that at different times during the signaling exchange described in FIG. 3, the peer to peer devices (302, 304) utilize different characteristic OFDM symbols. For example, the request signal 306 which is generated and transmitted by device 1 302 and which is received and processed by device 2 304 using a first type OFDM symbol, e.g., first type OFDM symbol 220. Continuing with the example, the RX echo signal 308 which is generated and transmitted by device 2 304 and which is received and processed by device 1 302 also uses a first type OFDM symbol. However, traffic signal 318 generated by device 1 302 and received and processed by device 2 304 uses a second type OFDM symbol, e.g., second type OFDM symbol 222.

Figure 4:
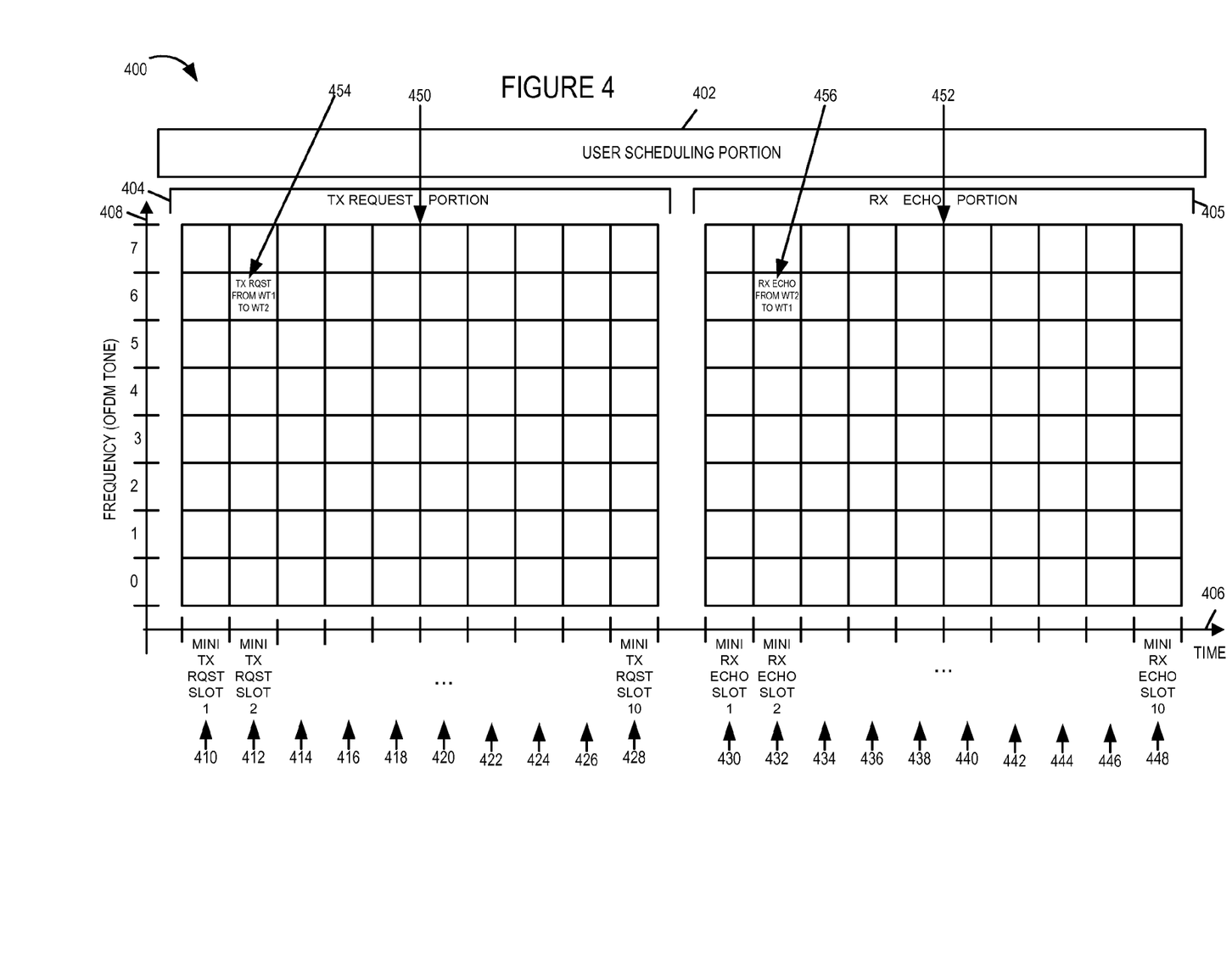
FIG. 4 is a drawing illustrating an exemplary user scheduling portion in a peer to peer recurring timing structure and an exemplary partition of air link resources of the user scheduling portion.

FIG. 4 is a drawing 400 illustrating an exemplary user scheduling portion in a peer to peer recurring timing structure and an exemplary partition of air link resources of the user scheduling portion. Exemplary user scheduling portion 402 is, e.g., user scheduling portion 212 of FIG. 2 or user scheduling portion 310 of FIG. 3. The user scheduling portion 402 includes a transmission request portion 404 designated to carry transmission request (TX request) signals, e.g., signal 306 of FIG. 3, and a request response portion 405 designated to carry RX echo signals, e.g., RX echo signal 308 of FIG. 3. Block 450 represents air link resources, e.g., OFDM tone-symbols, designated to be used to carry TX request signals, while block 452 represents air link resources, e.g., OFDM tone-symbols, designated to be used to carry RX echo signals. Horizontal axis 406 represents time corresponding to blocks (450, 452), while vertical axis 408 represents frequency, e.g., OFDM tones, corresponding to blocks (450, 452).

It should be observed that the TX request portion 404 has been sliced to include a number of mini TX request slots (mini TX request slot 1 410, mini TX request slot 2 412, mini TX request slot 3 414, mini TX request slot 4 416, mini TX request slot 5 418, mini TX request slot 6 420, mini TX request slot 7 422, mini TX request slot 8 424, mini TX request slot 9 426, mini TX request slot 10 428). Similarly the transmission request response portion, otherwise referred to as the RX echo portion 405 has been sliced to include a number of mini RX echo slots (mini RX echo slot 1 430, mini RX echo slot 2 432, mini RX echo slot 3 434, mini RX echo slot 4 436, mini RX echo slot 5 438, mini TX echo slot 6 440, mini RX echo slot 7 442, mini RX echo slot 8 444, mini RX echo slot 9 446, mini RX echo slot 10 448). A duration of a mini-slot used to carry an OFDM symbol conveying a transmission request or a request response is less than the duration of an OFDM symbol transmission time interval used to carry a peer to peer traffic signal.

With respect to frequency, the air link resource blocks (450, 452) are also subdivided to include a number of contiguous OFDM indexed tones (tone 0, tone 1, tone 2, tone 3, tone 4, tone 5, tone 6, tone 7). In accordance with one feature the tone spacing for tones in an OFDM symbol used to carry a TX request or RX echo signal is larger than the tone spacing used to carry a peer to peer traffic channel signal.

Consider that an exemplary WT 1 has an existing peer to peer connection with an exemplary WT 2. Exemplary tone-symbol 454 is designated to carry a TX request signal from WT 1 to WT 2 requesting to transmit peer to peer traffic signals in a corresponding peer to peer traffic interval. Similarly, exemplary tone-symbol 456 is designated to carry an RX echo signal from WT 2 to WT 1 in response to the request. By utilizing the concept of mini-slots, WT 1 can be operated in transmit mode during mini-TX slot 2 412, but can operate in receive mode during the other mini-slots. Similarly, WT 2 can be operated in the transmit mode during mini-RX echo slot 2 432 but can operate in receive mode during the other mini-slots. Thus, with respect to the user scheduling portion 402, for this example, WT 1 need only be in the transmit mode during the short duration of mini-TX request slot 2 412. Similarly, with respect to the user scheduling portion 402, for this example, WT 2 need only be in the transmit mode during the short duration of mini-RX echo slot 2 432.

It is beneficial to minimize transmit time for the wireless terminal during control intervals. In various embodiments, a wireless terminal can be in either a transmit mode or a receive mode at a given time, thus when transmitting a wireless terminal can not listen. It is advantageous for the wireless terminal to be able to listen to devices which have connections and may be signaling transmission requests and/or transmission request response signals corresponding to the same peer to peer traffic resource. By being able to listen to the signaling of the other devices, a wireless terminal can become aware of interference considerations. Such interference consideration can be, and sometimes are, used to decide whether or not to yield a traffic transmission resource, e.g., traffic segment.

Consider that each of the OFDM tone-symbols of the air link resource block 450 are associated with transmission requests corresponding to a single direction for a pair of connected peer to peer wireless terminals. In the example of FIG. 4, there are 70 OFDM tone-symbols. Each one of the seventy can be associated with a potential traffic request corresponding to a request to transmit for one direction for a pair of connected wireless terminals. Wireless terminal 1 which is assigned OFDM tone-symbol 454 for its request to WT 2, will be unable to monitor requests being transmitted concurrently from any of the six other OFDM tone-symbols mini TX request slot 2 412; however, WT 1 can monitor the requests being transmitted which correspond to any of the other 63 OFDM tone-symbols of min-slots (410, 414, 416, 418, 420, 420, 422, 424, 426, 428). Wireless terminal 2 which is assigned OFDM tone-symbol 456 for its request response signal, the RX echo to WT 1, will be unable to monitor RX echos being transmitted concurrently from any of the six other OFDM tone-symbols mini RX echo slot 2 432; however, WT 2 can monitor the requests being transmitted which correspond to any of the other 63 OFDM tone-symbols of mini-slots (430, 434, 436, 438, 440, 442, 444, 446, 448).

Thus, as can be observed chopping the control period into small time periods allows a wireless terminal to listen to other control signaling transmissions and tends to minimize the number of users in a sub-interval, e.g., a mini slot.

Figure 5:
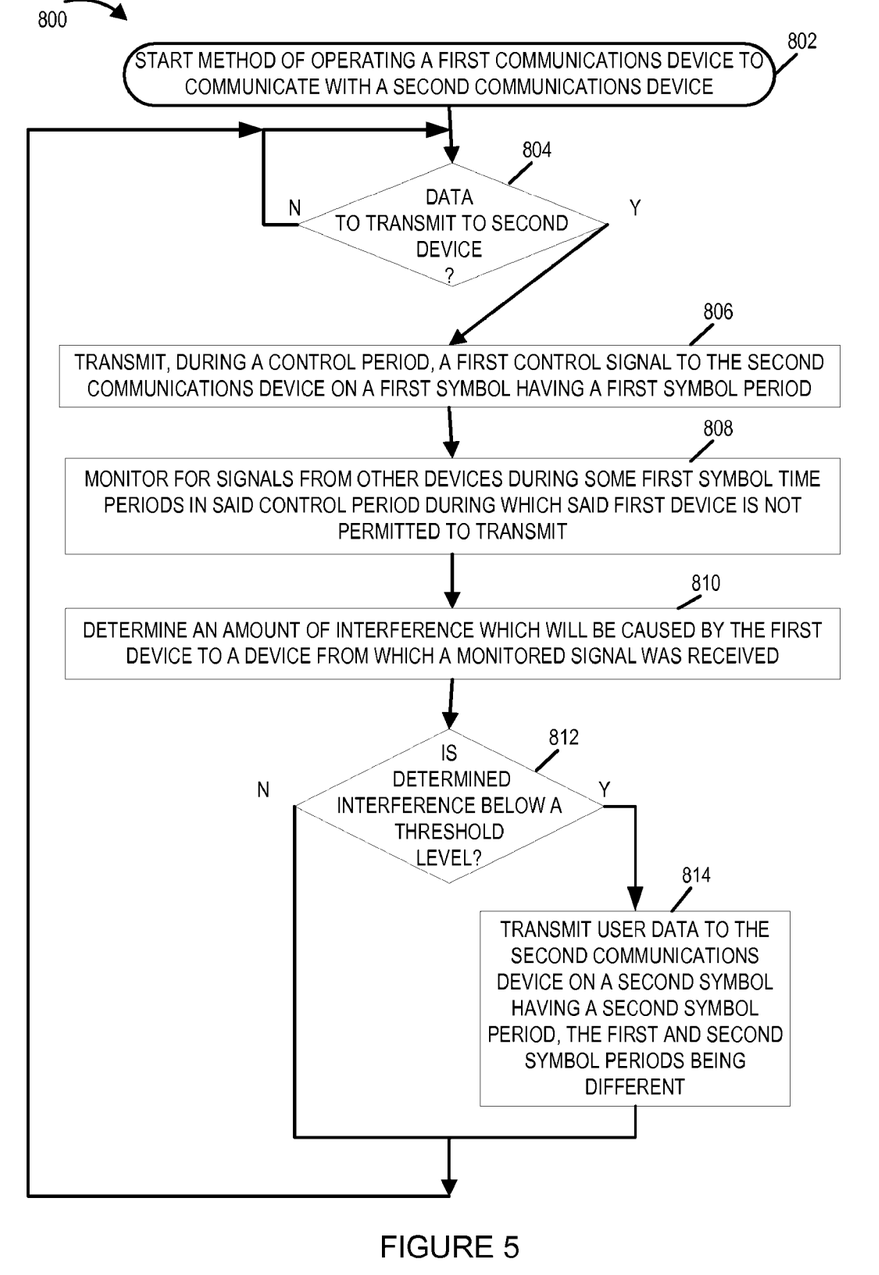
FIG. 5 is a flowchart of an exemplary method of operating a first communications device to communicate with a second communications device in accordance with various embodiments.

FIG. 5 is a flowchart 800 of an exemplary method of operating a first communications device to communicate with a second communications device in accordance with various embodiments. The first and second communications devices are, e.g., peer to peer wireless communications devices. Operation proceeds from start step 802 to step 804, in which the first communications device determines whether or not it has data, e.g., traffic data, that it would like to transmit to the second communications device. If the first device determines that it has data that it would like to transmit, then operation proceeds form step 804 to step 806; otherwise, operation proceeds from step 804 back to step 804, e.g., where it makes another data transmission determination for another traffic slot.

In step 806, the first device transmits, during a control period, a first control signal to the second communications device on a first symbol having a first symbol period. In some embodiments, the first signal is a transmission request. Operation proceeds from step 806 to step 808. In step 808 the first device monitors for signals from other devices during some first symbol time periods in said control period during which said first device is not permitted to transmit. In various embodiments, the monitoring is to detect a signal from the second device. Operation proceeds from step 808 to step 810. In step 810, the first device determines an amount of interference which will be caused by the first device to a device from which a monitored signal was received. Operation proceeds from step 810 to step 812.

In step 812, the first device compares the interference determination to a threshold and proceeds depending upon the comparison. If the determined interference of step 810 is below a threshold level, then operation proceeds from step 812 to step 814. However if the interference is not below the threshold, then operation proceeds from step 812 to step 804.

Returning to step 814, in step 814 the first communications device transmits user data to the second communications device on a second symbol having a second symbol period, the first and second symbol periods being different. In various embodiments, the second symbol period is longer than the first symbol period. In some such embodiments, the second symbol period is at least 5 times longer than the first symbol period. In various embodiments the first symbol includes one of a first plurality of contiguous tones and the second symbol includes one of a second plurality of contiguous tones, tones in said first plurality of contiguous tones being spaced further apart in frequency than tones in said second plurality of tones. In some embodiments, the first and second symbols are OFDM symbols. Operation proceeds from step 814 to step 804, where the first device makes another data transmission determination for another traffic slot.

In some embodiments, the transmitted first control signal is a transmission request which is a request to transmit during a data transmission interval including said second symbol time period. In some embodiments, the first symbol occurs within a control period including a plurality of symbol periods, said first device being permitted to transmit during said control period only in a subset of said plurality of symbol periods, said subset corresponding to at most one half of the symbol periods in said control period. In various embodiments, the first symbol occurs within a control period including a plurality of first symbol periods, said first device being permitted to transmit during said control period only in a subset of said plurality of first symbol periods, said subset corresponding to less than one third of the first symbol periods in said control period.

Figure 6:
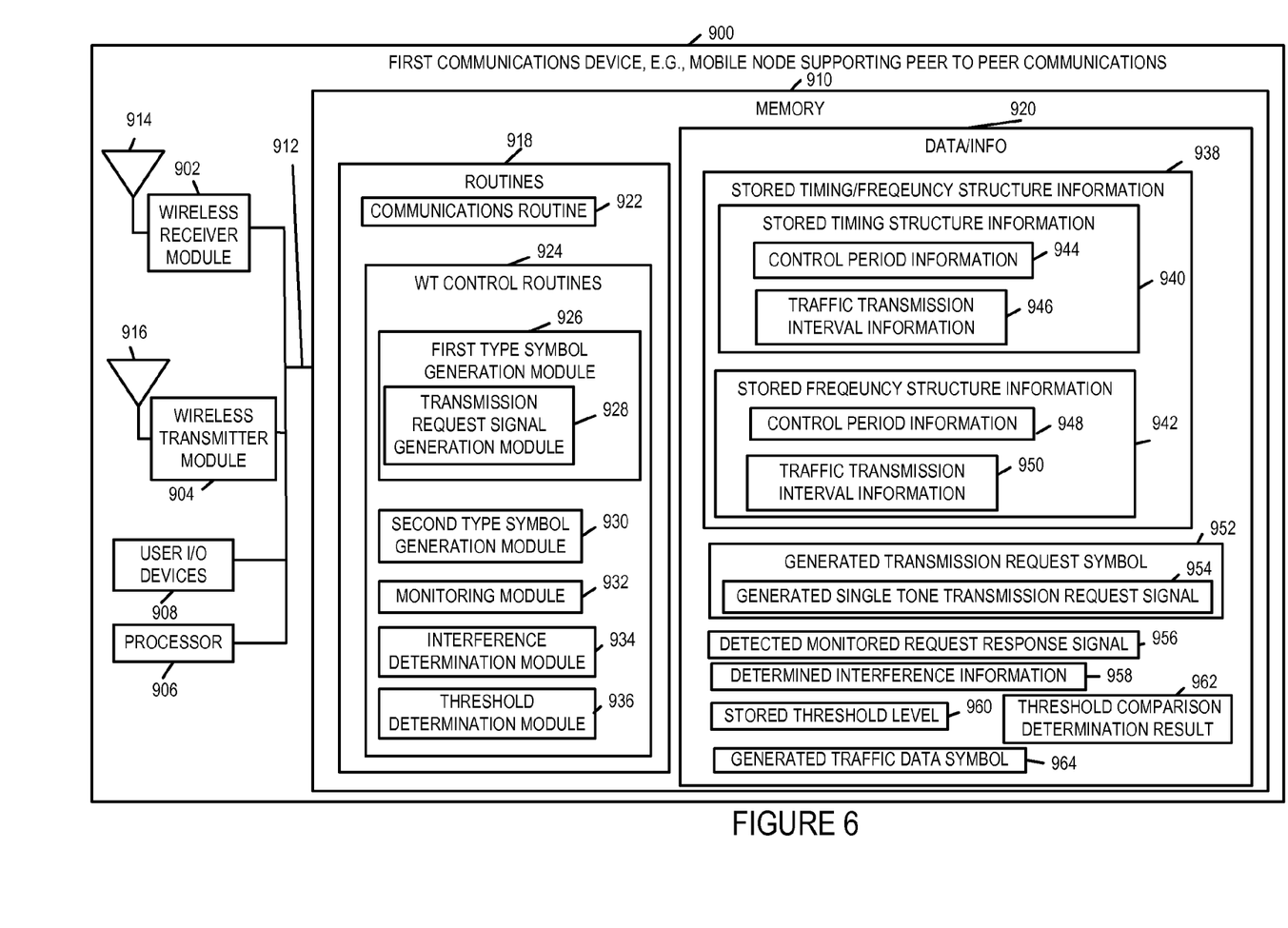
FIG. 6 is a drawing of an exemplary communications device, e.g., a wireless mobile node supporting peer to peer communications in accordance with various embodiments.

FIG. 6 is a drawing of an exemplary first communications device 900, e.g., a wireless mobile node supporting peer to peer communications. Exemplary first communications device 900 communicates with a second communications device, e.g., another peer to peer communications device. Exemplary peer to peer communications device 900 includes a wireless receiver module 902, a wireless transmitter module 904, user I/O devices 908, a processor 906, and memory 910 coupled together via a bus 912 over which the various elements may interchange data and information.

Wireless receiver module 902, e.g., an OFDM receiver, is coupled to receive antenna 914 via which the first communications device 900 receives signals from communications devices, e.g., other peer to peer communications devices. Wireless receiver module 902 receives symbols of the first type communicating control information and symbols of the second type communicating user data.

Wireless transmitter module 904, e.g., an OFDM transmitter, is coupled to transmit antenna 916 via which the first communications device 900 transmits signals to other devices, e.g., to other peer to peer communications devices. Wireless transmitter module 904 transmits symbols of the first type communicating control information and symbols of the second type communicating user data.

User I/O devices 908 include, e.g., a microphone, a keyboard, a keyboard, switches, a mouse, speaker, display, etc. The user I/O devices 908 allow a user of first communications device 900 to input data/information, access output data/information, and control at least some functions of the first communications device 900.

Memory 910 includes routines 918 and data/information 920. The processor 906, e.g., a CPU, executes the routines 918 and uses the data/information 920 in memory 910 to control the operation of the first communications device 900 and implement methods, e.g., the method of flowchart 800 of FIG. 5.

Routines 918 include a communications routine 922 and wireless terminal control routines 924. The communications routine 922 implements the various communications protocols used by the first communications device 900. The wireless terminal control routines 924 include a first type symbol generation module 926, a second type symbol generation module 930, a monitoring module 932, an interference determination module 934 and a threshold determination module 936. The first symbol type generation module 926 includes a transmission request signal generation module 928.

Data/information 920 includes stored timing/frequency structure information 938, a generated transmission request symbol 952, a detected monitored request response signal 956, determined interference information 958, a stored threshold level 960, a threshold comparison determination result 962 and a generated traffic data symbol 964.

The stored timing frequency structure information 938 includes stored timing structure information 940 and stored frequency structure information 942. The stored timing structure information 940 includes control period information 944 and traffic transmission interval information 946. The stored frequency structure information 942 includes control period information 948 and traffic transmission interval information 950. The generated transmission request symbol 952 includes a generated single tone transmission request signal 954.

First type symbol generation module 926 generates symbols of the first type used to communicate control information, symbols of the first type having a first symbol period. Second type symbol generation module 930 generates symbols of the second type, symbols of the second type having a second symbol period, said first and second symbol periods being different. In various embodiments, the second symbol period is longer than the first symbol period. In some such embodiments, the second symbol period is at least 5 times longer than the first symbol period. In some embodiments symbols of the first type and symbols of the second type are both OFDM symbols.

In various embodiments, symbols of the first type include one of a first plurality of contiguous tones and symbols of the second type include one of a second plurality of contiguous tones, tones in said first plurality of tones being spaced farther apart in frequency than tones in said second plurality of tones.

Transmission request signal generation module 928 generates a single tone transmission request signal. In some embodiments, the single tone transmission request signal is a request to transmit during a data transmission interval including a second symbol transmission time period. For example, the data transmission interval includes a peer to peer traffic segment and peer to peer traffic segment signals are communicated using symbols of the second type.

Monitoring module 932 monitors for signals from other devices during some symbol transmission time periods in said control period during which said first communications device is not permitted to transmit. For example, the monitoring module 932 monitors to detect a signal, e.g., a transmission request response signal such as an RX echo signal, from a second device with which the first device has an ongoing peer to peer connection.

Interference determination module 934 determines an amount of interference which will be caused by the first communications device to a device from which the monitored signal was received. Threshold determination module 936 checks, prior to transmitting user data on a second signal, that the interference which will be caused by the first communications device to said device from which the monitored signal was received is below a threshold level used to determine whether or not to transmit.

Stored timing/frequency structure information 938 includes stored timing structure information 940 and stored frequency structure information 942. Stored timing structure information 940 includes control period information 944 and traffic transmission interval information 946. Control period information 944 includes information indicating the time duration of a first symbol period, the number of first symbol periods in the control period, and indexing information related to the plurality of first symbol periods in the control period. Control period information 944 includes information indicating that the first symbol occurs within a control period including a plurality of symbol periods and that the first device is permitted to transmit during said control period only in a subset of said plurality of symbol periods, said subset corresponding to at most one half of the symbol periods in the control period. In some such embodiments, the subset corresponds to less than one third of the symbol periods in the control period. Traffic transmission interval information 946 includes information indicating the time duration of a second symbol period, the number of second symbol periods in the traffic transmission time interval, and indexing information related to the plurality of second symbol periods in the traffic transmission interval.

Stored frequency structure information 942 includes control period information 948 and traffic transmission interval information 950. Control period information 948 includes information identifying the number of tones in a first type symbol, the tone spacing for tones of a first type symbol, indexing information relating to the tones of a first type symbol, and information identifying a contiguous block of tones corresponding to a first type symbol. Traffic transmission interval information 950 includes information identifying the number of tones in a second type symbol, the tone spacing for tones of a second type symbol, indexing information relating to the tones of a second type symbol, and information identifying a contiguous block of tones corresponding to a second type symbol. In some embodiments, the contiguous tone block corresponding to a first type symbol is substantially the same as the contiguous tone block corresponding to a second type symbol.

Figure 7:
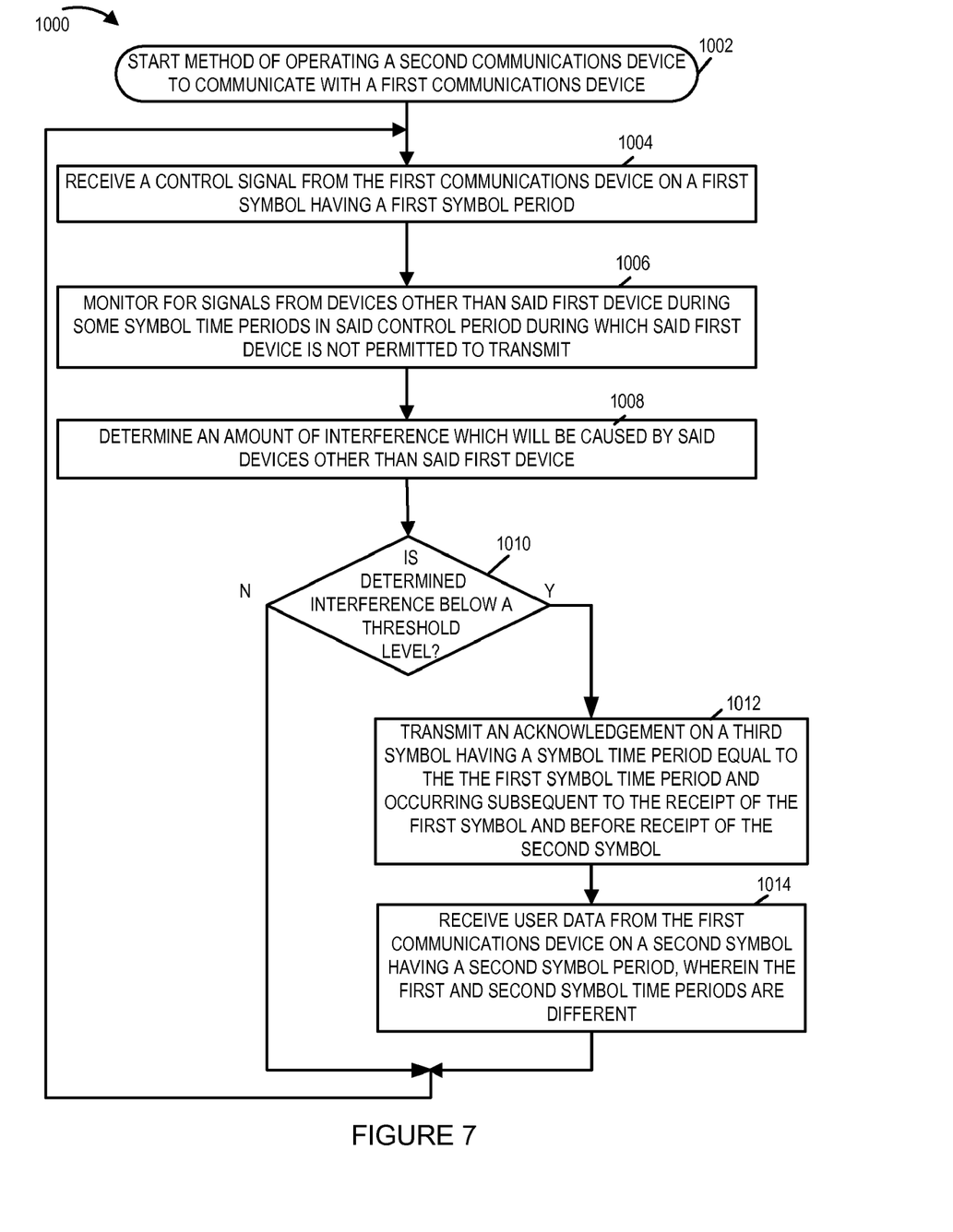
FIG. 7 is a flowchart of an exemplary method of operating a second communications device to communicate with a first communications device in accordance with various embodiments.

FIG. 7 is a flowchart 1000 of an exemplary method of operating a second communications device to communicate with a first communications device in accordance with various embodiments. The first and second communications devices are, e.g., peer to peer wireless communications devices. Operation starts in step 1002 and proceeds to step 1004. In step 1004, the second communications device receives a control signal from the first communications device on a first symbol having a first symbol period. In some embodiments, the first control signal is a transmission request. The transmission request is, e.g., a request to transmit data, e.g., user data traffic signals, during a data transmission interval including a second symbol having a second symbol time period which is different from the first symbol time period. In some embodiments, the first symbol occurs within a control period including a plurality of symbol periods, said first device being permitted to transmit during said control period only in a first subset of said plurality of symbol periods, said first subset corresponding to at most one half of the symbol periods in said control period. In some such embodiments, said first subset corresponds to less than one third of the symbol periods in said control period. Operation proceeds from step 1004 to step 1006.

In step 1006, the second communications device monitors for signals from devices other than said first device during some symbol time periods in said control period during which said first device is not permitted to transmit. Operation proceeds from step 1006 to step 1008. In step 1008 the second communications device determines an amount of interference which will be caused by said devices other than said first device. Operation proceeds from step 1008 to step 1010.

In step 1010, if the determined interference of step 1008 is below a threshold level, then operation proceeds from step 1010 to step 1012, in which the second communications device transmits an acknowledgment on a third symbol having a symbol time period equal to the first symbol time period and occurring subsequent to the receipt of the first symbol and before receipt of the second symbol. In some embodiments, the third symbol occurs within said control period including a plurality of symbol periods, and the second device is permitted to transmit during said control period only in a second subset of said plurality of symbol periods, said second subset corresponding to at most one half of the symbol periods in said control period. In some such embodiments said second subset corresponds to less than one third of the symbol periods in said control period. Operation proceeds from step 1012 to step 1014, in which the second communications device receives user data from the first communications device on a second symbol having a second symbol period, wherein the first and second symbol periods are different.

In some embodiments, the first and second symbols are OFDM symbols. In various embodiments, the second symbol period is longer than the first symbol period. In some such embodiments, the second symbol period is at least five times longer than the first symbol period. In some embodiments, the first symbol uses one of a first plurality of contiguous tones and the second symbol uses one of a second plurality of contiguous tones, and tones in the first plurality of contiguous tones are spaced farther apart in frequency than tones in said second plurality of contiguous tones.

Operation proceeds from step 1014 to step 1004, where the second communications device performs operations pertaining to another slot, e.g., another peer to peer traffic slot.

Returning to step 1010, if the determined interference of step 1008 is not below a threshold level, then operation proceeds from step 1010 to step 1004, where the second communications device performs operations pertaining to another slot, e.g., another peer to peer traffic slot.

Figure 8:
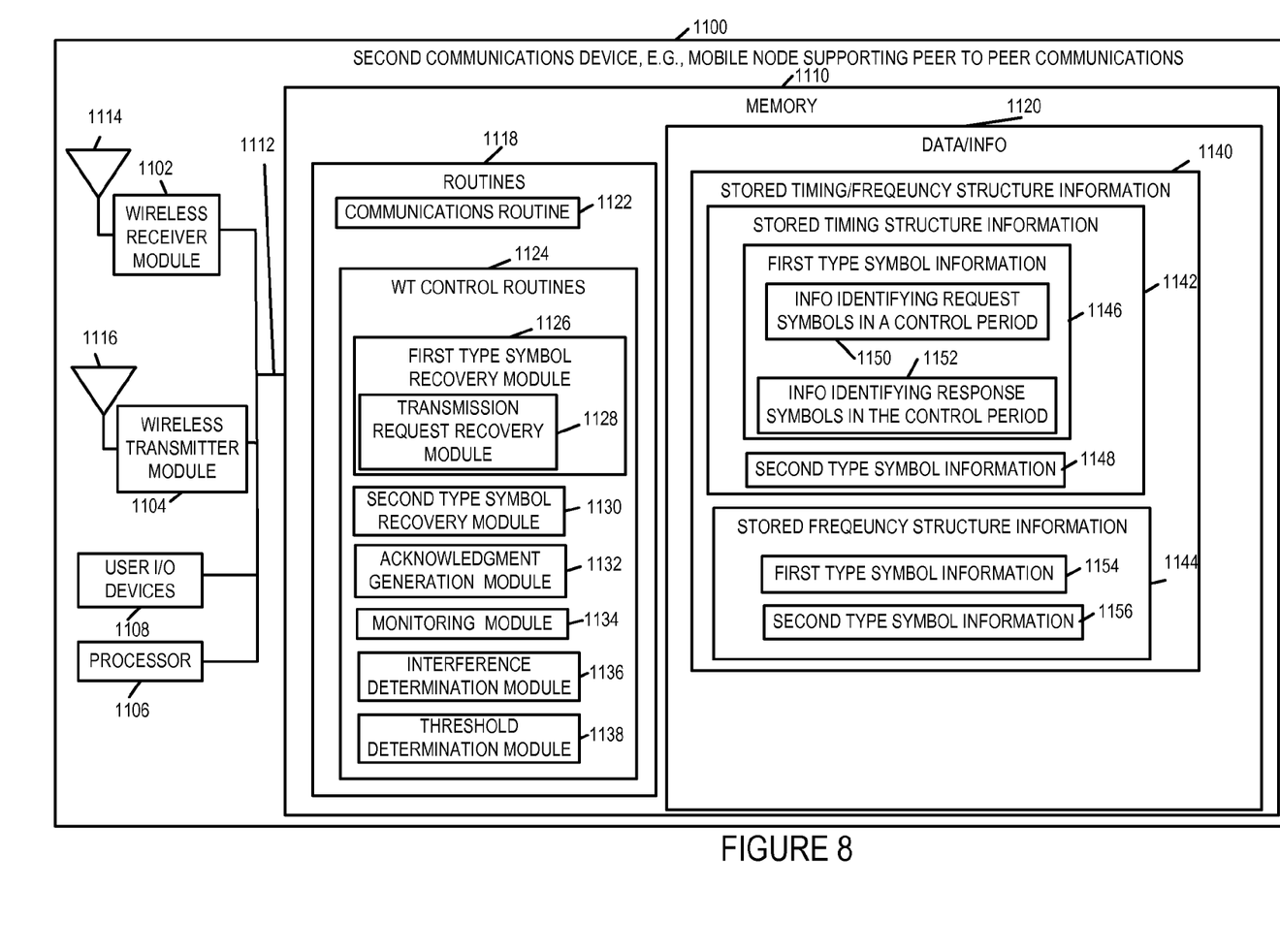
FIG. 8 is a drawing of an exemplary second communications device e.g., a wireless mobile node supporting peer to peer communications, in accordance with various embodiments.

FIG. 8 is a drawing of an exemplary second communications device 1100, e.g., a wireless mobile node supporting peer to peer communications. Exemplary second communications device 1100 communicates with a first communications device, e.g., another peer to peer communications device. Exemplary second peer to peer communications device 1100 includes a wireless receiver module 1102, a wireless transmitter module 1104, user I/O devices 1108, a processor 1106, and memory 1110 coupled together via a bus 1112 over which the various elements may interchange data and information.

Wireless receiver module 1102, e.g., an OFDM receiver, is coupled to receive antenna 1114 via which the second communications device 1100 receives signals from communications devices, e.g., other peer to peer communications devices. Wireless receiver module 1102 receives control signals and user data signals. Wireless receiver module 1102 receives symbols of a first type communicating control information and symbols of a second type communicating user data.

Wireless transmitter module 1104, e.g., an OFDM transmitter, is coupled to transmit antenna 1116 via which the second communications device 1100 transmits signals to other devices, e.g., to other peer to peer communications devices. Wireless transmitter module 1104 transmits a generated transmission request acceptance signal, e.g., an RX echo signal, to another communications device, e.g., a first communications device, on a third symbol having a symbol period equal to the first symbol time period and occurring subsequent to the receipt of the first symbol, e.g., the transmission request symbol, and before receipt of the second symbol, e.g., a peer to peer user data traffic signal.

User I/O devices 1108 include, e.g., a microphone, a keyboard, a keyboard, switches, a mouse, speaker, display, etc. The user I/O devices 1108 allow a user of second communications device 1100 to input data/information, access output data/information, and control at least some functions of the second communications device 1100.

Memory 1110 includes routines 1118 and data/information 1120. The processor 1106, e.g., a CPU, executes the routines 1118 and uses the data/information 1120 in memory 1110 to control the operation of the second communications device 1100 and implement methods, e.g., the method of flowchart 1000 of FIG. 7.

Routines 1118 include a communications routine 1122 and wireless terminal control routines 1124. The communications routine 1122 implements the various communications protocols used by the second communications device 1100. The wireless terminal control routines 1124 include a first type symbol recovery module 1126, a second type symbol recovery module 1130, an acknowledgement generation module 1132, a monitoring module 1134, an interference determination module 1136 and a threshold determination module 1138. The first symbol type recovery module 1126 includes a transmission request signal recovery module 1128.

Data/information 1120 includes stored timing/frequency structure information 1140. The stored timing frequency structure information 1140 includes stored timing structure information 1142 and stored frequency structure information 1144.

First type symbol recovery module 1126 recovers first type symbols used to communicate control information, wherein first symbols have a first symbol period. Second type symbol recovery module 1130 recovers second type symbols used to communicate user data, wherein second type symbols have a second symbol period and wherein the first and second symbol periods are different. In various embodiments, the second symbol period is longer than the first symbol period. In some such embodiments, the second symbol period is at least 5 times longer than the first symbol period. In various embodiments, the first and second symbols are OFDM symbols.

Transmission request recovery module 1128, included in first type symbol recovery module 1126, recovers a transmission request. In various embodiments, the transmission request is a request to transmit during a data transmission interval including a second symbol period. The data transmission interval is, e.g., a peer to peer traffic data transmission interval including air link resources designated to carry a plurality of second type symbols. The received request is, e.g., a request from a first communications device to the second communications device 1100 requesting to transmit user data peer to peer traffic signals from the first communications device to the second communications device 1100 using a peer to peer traffic segment which occurs during the data transmission interval.

Acknowledgement generation module 1132 is for generating a transmission request acceptance signal, e.g., an RX echo signal. Monitoring module 1134 monitors for signals from other devices other than the first communications device during some symbol time periods in said control period during which the first communications device is not permitted to transmit. Interference determination module 1136 determines an amount of interference which will be caused by devices other than said first communications device. Thus interference determination module 1136 determines an estimated amount of interference from other devices to peer to peer communications from the first communications device to the second communications device 1100.

Threshold determination module 1138 determines, prior to transmitting an acknowledgment on the third symbol, whether the interference which will be caused by devices other than said first device from which the monitored signal was received is below a threshold level used to determine whether or not to transmit an acknowledgement. In various embodiments, intentionally refraining from transmitting an acknowledgment to the first communications device, which transmitted a transmission request signal to the second communications device 1100, is a denial of the request.

Stored timing structure information 1142 includes first type symbol information 1146 and second type symbol information 1148. The first type symbol information 1146 includes information identifying request symbols in a control period 1150 and information identifying response symbols in the control period 1152. Request and response symbols are both symbols of the first type and communicate control information. First type symbol information 1146 also includes information identifying the duration of a first symbol period used for a first type symbol. Second type symbol information 1148 includes information identifying the duration of second symbol period. In various embodiments, a second symbol period is at least 5 times longer than a first symbol period.

Stored frequency structure information 1144 includes first type symbol information 1154 and second type symbol information 1156. First type symbol information 1154 includes information identifying a first plurality of contiguous tones, e.g., OFDM tones, used for symbols of the first type. Second type symbol information 1156 includes information identifying a second plurality of contiguous tones, e.g., OFDM tones, used for symbols of the second type. In various embodiments tones in the first plurality of tones are spaced father apart than tones in the second plurality of tones.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, transmitting a first control signal to a second communications device in a first symbol having a first symbol period, transmitting user data to the second communications device on a second symbol having a second symbol period, the first and second symbol periods being different, monitoring for signals from other devices, determining an amount of interference, comparing determined interference to a threshold level, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first communications device to communicate with a second communications device, the method comprising:
  transmitting a first control signal to the second communications device on a first symbol having a first symbol period; and
  transmitting user data to the second communications device on a second symbol having a second symbol period, the first and second symbol periods being different, wherein said first symbol includes one of a first plurality of contiguous tones and said second symbol includes one of a second plurality of contiguous tones, tones in said first plurality of tones being spaced further apart in frequency than tones in said second plurality of tones.

2. The method of claim 1, wherein the second symbol period is longer than the first symbol period.

3. The method of claim 2, wherein the second symbol period is at least 5 times longer than said first symbol period.

4. The method of claim 2, wherein said first symbol occurs within a control period including a plurality of symbol periods, said first device being permitted to transmit during said control period only in a subset of said plurality of symbol periods, said subset corresponding to at most one half of the symbol periods in said control period.

5. The method of claim 4, further comprising:
  monitoring for signals from other devices during some symbol time periods in said control period during which said first device is not permitted to transmit.

6. The method of claim 5, wherein monitoring is to detect a signal from the second device.

7. The method of claim 5, further comprising:
  determining an amount of interference which will be caused by the first device to a device from which a monitored signal was received; and
  prior to transmitting user data on said second symbol, determining that the interference which will be caused by the first device to said device from which the monitored signal was received is below a threshold level used to determine whether or not to transmit.

8. The method of claim 2,
  wherein said first and second devices are peer to peer communications devices; and
  wherein said first and second symbols are OFDM symbols.

9. The method of claim 1, wherein said first control signal is a transmission request.

10. The method of claim 9, wherein said transmission request is a request to transmit during a data transmission interval including said second symbol period.

11. A first communications device, comprising:
  a first type symbol generation module for generating symbols of a first type used to communicate control information, symbols of said first type having a first symbol period;
  a second type symbol generation module for generating symbols of a second type, symbols of a second type having a second symbol period, said first and second symbol periods being different, wherein said first symbol includes one of a first plurality of contiguous tones and said second symbol includes one of a second plurality of contiguous tones, tones in said first plurality of tones being spaced further apart in frequency than tones in said second plurality of tones; and
  a wireless transmitter for transmitting symbols of the first type communicating control information and symbols of the second type communicating user data.

12. The first communications device of claim 11, wherein the second symbol period is longer than the first symbol period.

13. The first communications device of claim 12, wherein the second symbol period is at least 5 times longer than said first symbol period.

14. The first communications device of claim 12, further comprising:
  memory including stored timing structure information and wherein said stored timing structure information includes that said first symbol occurs within a control period including a plurality of symbol periods and that said first communications device is permitted to transmit during said control period only in a subset of said plurality of symbol periods, said subset corresponding to at most one half of the symbol periods in said control period; and
  a monitoring module for monitoring for signals from other devices during some symbol time periods in said control period during which said first communications device is not permitted to transmit.

15. The first communications device of claim 14, wherein said monitoring module monitors to detect a signal from a second communications device; and wherein the first communications device further comprises:
  an interference determination module for determining an amount of interference which will be caused by the first communications device to a device from which a monitored signal was received; and
  a threshold determination module for checking, prior to transmitting user data on said second symbol, that the interference which will be caused by the first communications device to said device from which the monitored signal was received is below a threshold level used to determine whether or not to transmit.

16. The first communications device of claim 12, wherein said first device communicates with a second communications device;
  wherein said first and second devices are peer to peer communications devices; and
  wherein said first and second symbols are OFDM symbols.

17. The first communications device of claim 11, wherein the first type symbol generation module includes a transmission request signal generation module which generates a single tone transmission request signal; and
  wherein said single tone transmission request signal is a request to transmit during a data transmission interval including said symbol transmission time period.

18. A communications device, comprising:
  first type symbol generation means for generating symbols of a first type used to communicate control information, symbols of said first type having a first symbol period;
  second type symbol generation means for generating symbols of a second type, symbols of a second type having a second symbol period, said first and second symbol periods being different, wherein said first symbol includes one of a first plurality of contiguous tones and said second symbol includes one of a second plurality of contiguous tones, tones in said first plurality of tones being spaced further apart in frequency than tones in said second plurality of tones; and
  wireless transmitter means for transmitting symbols of the first type communicating control information and symbols of the second type communicating user data.

19. The communications device of claim 18, wherein the second symbol period is longer than the first symbol period.

20. A non-transitory computer readable medium embodying machine executable instructions for:
- transmitting a first control signal to the second communications device on a first symbol having a first symbol period; and
- transmitting user data to the second communications device on a second symbol having a second symbol period, the first and second symbol periods being different, wherein said first symbol includes one of a first plurality of contiguous tones and said second symbol includes one of a second plurality of contiguous tones, tones in said first plurality of tones being spaced further apart in frequency than tones in said second plurality of tones.

21. The non-transitory computer readable medium of claim 20, wherein the second symbol period is longer than the first symbol period.

22. At least one processor
- associated with a communications device which communicates with a second communications device, the at least one processor configured to:
  - transmit a first control signal to the second communications device on a first symbol having a first symbol period; and
  - transmit user data to the second communications device on a second symbol having a second symbol period, the first and second symbol periods being different, wherein said first symbol includes one of a first plurality of contiguous tones and said second symbol includes one of a second plurality of contiguous tones, tones in said first plurality of tones being spaced further apart in frequency than tones in said second plurality of tones.

23. The at least one processor of claim 22, wherein the second symbol period is longer than the first symbol period.

24. A method of operating a second communications device to communicate with a first communications device, the method comprising:
- receiving a control signal from the first communications device on a first symbol having a first symbol period; and
- receiving user data from the first communications device on a second symbol having a second symbol period, the first and second symbol periods being different, wherein said first symbol uses one of a first plurality of contiguous tones and said second symbol uses one of a second plurality of contiguous tones, tones in said first plurality of tones being spaced further apart in frequency than tones in said second plurality of tones.

25. The method of claim 24, wherein the second symbol period is longer than the first symbol period.

26. The method of claim 25, wherein the second symbol period is at least 5 times longer than said first symbol period.

27. The method of claim 25, further comprising:
- transmitting an acknowledgement on a third symbol having a symbol time period equal to the first symbol time period and occurring subsequent to the receipt of the first symbol and before transmission of the received second symbol.

28. The method of claim 27, wherein said third symbol occurs within a control period including a plurality of symbol periods, said second device being permitted to transmit during said control period only in a subset of said plurality of symbol periods, said subset corresponding to at most one half of the symbol periods in said control period.

29. The method of claim 27, wherein said first symbol occurs within a control period including a plurality of symbol periods, said first device being permitted to transmit during said control period only in a subset of said plurality of symbol periods, said subset corresponding to at most one half of the symbol periods in said control period.

30. The method of claim 29, further comprising;
- monitoring for signals from devices other than said first device during some symbol time periods in said control period during which said first device is not permitted to transmit.

31. The method of claim 30, further comprising:
- determining an amount of interference which will be caused by said devices other than said first device; and
- prior to transmitting said acknowledgement on the third symbol, determining that the interference which will be caused by said devices other than said first device from which the monitored signals were received is below a threshold level used to determine whether or not to transmit said acknowledgment.

32. The method of claim 30, wherein symbol time periods in said control period during which said first device is permitted to transmit are interleaved with symbol time periods in said control period during which said first device is not permitted to transmit.

33. The method of claim 25,
- wherein said first and second devices are peer to peer communications devices; and
- wherein said first and second symbols are OFDM symbols.

34. The method of claim 24, wherein said first control signal is a transmission request.

35. The method of claim 34, wherein said transmission request is a request to transmit during a data transmission interval including said second symbol period.

36. A second communications device for communicating with a first communications device, the second communications device comprising:
- a receiver for receiving control signals and user data signals;
- a first type symbol recovery module for recovering first type symbols used to communicate control information, the first type symbols having a first symbol period; and
- a second type symbol recovery module for recovering second type symbols used to communicate user data, said second type symbols having a second symbol period, the first and second symbol periods being different;
- memory including timing structure information and frequency structure information; and
- wherein said first symbol uses one of a first plurality of contiguous tones and said second symbol uses one of a second plurality of contiguous tones, tones in said first plurality of tones being spaced further apart in frequency than tones in said second plurality of tones.

37. The second communications device of claim 36, wherein the second symbol period is longer than the first symbol period.

38. The second communications device of claim 37,
- wherein said first type symbol recovery module includes a transmission request recovery module for recovering a transmission request; and
- wherein said transmission request is a request to transmit during a data transmission interval including said second symbol period.

39. The communications device of claim 37, further comprising:
- an acknowledgment generation module for generating a transmission request acceptance signal; and
- a wireless transmitter module for transmitting said transmission request acceptance signal acknowledgement on a third symbol having a symbol time period equal to the first symbol time period and occurring subsequent to the receipt of the first symbol and before receipt of the second symbol.

40. The second communications device of claim 39, wherein said stored timing structure information includes information identifying request symbols and response symbols within a control period, said request symbols and response symbols being of the first type and communicating control information; and wherein the second communications device further comprises:
- a monitoring module for monitoring for signals from devices other than said first device during some symbol time periods in said control period during which said first device is not permitted to transmit;
- an interference determination module for determining an amount of interference which will be caused by said devices other the said first device; and
- a threshold determination module for determining, prior to transmitting said acknowledgement on the third symbol, whether the interference which will be caused by said devices other than said first device from which the monitored signals were received is below a threshold level used to determine whether or not to transmit said acknowledgment.

41. The second communications device of claim 37,
wherein said first and second devices are peer to peer communications devices; and
wherein said first and second symbols are OFDM symbols.

42. A second communications device for communicating with a first communications device, the second communications device comprising:
- receiver means for receiving control signals and user data signals;
- first type symbol recovery means for recovering first type symbols used to communicate control information, the first type symbols having a first symbol period; and
- second type symbol recovery means for recovering second type symbols used to communicate user data, said second type symbols having a second symbol period, the first and second symbol periods being different, wherein said first symbol uses one of a first plurality of contiguous tones and said second symbol uses one of a second plurality of contiguous tones, tones in said first plurality of tones being spaced further apart in frequency than tones in said second plurality of tones.

43. The second communications device of claim 42, wherein the second symbol period is longer than the first symbol period; and
wherein the second communications device further comprises:
memory means including stored timing structure information; and
wherein the second symbol period is at least 5 times longer than said first symbol period.

44. A non-transitory computer readable medium embodying machine executable instructions for:
receiving a control signal from the first communications device on a first symbol having a first symbol period; and
receiving user data from the first communications device on a second symbol having a second symbol period, the first and second symbol periods being different, wherein said first symbol uses one of a first plurality of contiguous tones and said second symbol uses one of a second plurality of contiguous tones, tones in said first plurality of tones being spaced further apart in frequency than tones in said second plurality of tones.

45. At least one processor
associated with a second communications device, which communicates with a first communications device, the at least one processor configured to:
receive a control signal from the first communications device on a first symbol having a first symbol period; and
receive user data from the first communications device on a second symbol having a second symbol period, the first and second symbol periods being different, wherein said first symbol uses one of a first plurality of contiguous tones and said second symbol uses one of a second plurality of contiguous tones, tones in said first plurality of tones being spaced further apart in frequency than tones in said second plurality of tones.

46. The apparatus of claim 45, wherein the second symbol period is longer than the first symbol period.

* * * * *